United States Patent [19]

Van Dongen et al.

[11] Patent Number: 4,811,391
[45] Date of Patent: Mar. 7, 1989

[54] TELEPHONE SET COMPRISING A LINE VOLTAGE STABILIZER HAVING A DC SUPPLY POINT

[75] Inventors: Frederik Van Dongen; Peter J. M. Sijbers, both of Eindhoven, Netherlands

[73] Assignee: U.S. Philips Corp., New York, N.Y.

[21] Appl. No.: 55,484

[22] Filed: May 29, 1987

[30] Foreign Application Priority Data

Jun. 16, 1986 [NL] Netherlands ............... 8601548

[51] Int. Cl.⁴ .................. H04M 1/00; H04M 19/08
[52] U.S. Cl. ........................... 379/387; 379/413
[58] Field of Search ............... 379/387, 394, 395, 398, 379/399, 400, 401, 412, 413; 323/220, 221, 222, 223, 224, 225, 226, 227, 228, 229, 230, 231, 232, 233

[56] References Cited

U.S. PATENT DOCUMENTS

| 4,341,991 | 7/1982 | Geboers et al. | 323/311 |
| 4,388,498 | 6/1983 | Geboers et al. | 379/387 |
| 4,626,626 | 12/1986 | Coulmance | 379/394 |
| 4,639,551 | 1/1987 | Kaire | 323/231 |
| 4,680,789 | 7/1987 | Sijbers et al. | 379/395 |

Primary Examiner—Jin F. Ng
Assistant Examiner—Randall S. Vaas
Attorney, Agent, or Firm—Thomas A. Briody; Leroy Eason

[57] ABSTRACT

A telephone set comprising an active line voltage stabilizer circuit having two output terminals 10-1 and 10-2 between which it produces a stabilized direct voltage which is independent of the line current. A series arrangement of a capacitor (14) and a resistor (16) is connected between such output terminals, the junction thereof constituting a DC supply terminal for the telephone set. Such arrangement does not alter the a.c. impedance of the stabilizer circuit between the wires, and has a considerably lower d.c. output resistance than supply terminals previously employed.

1 Claim, 1 Drawing Sheet

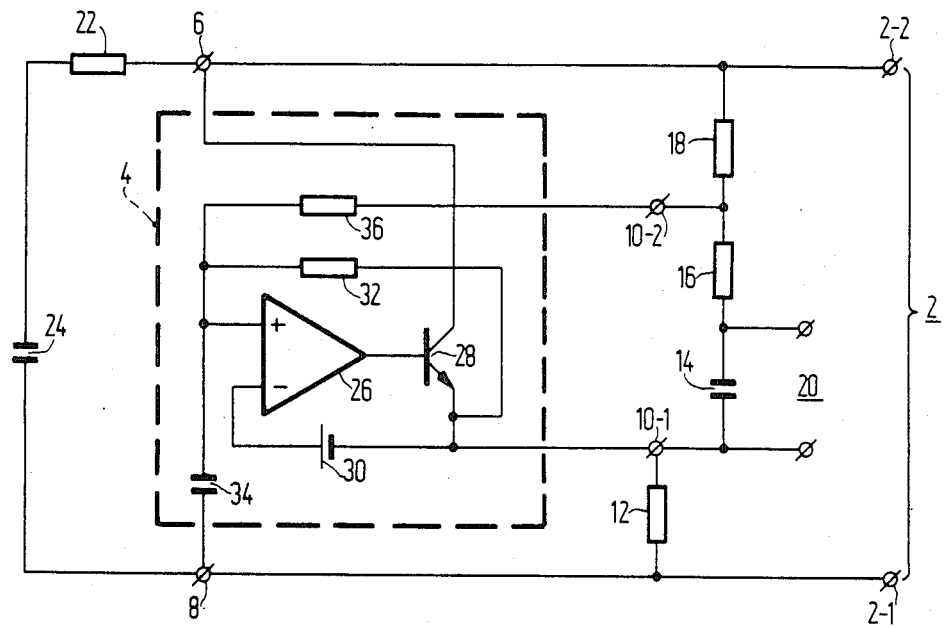

TELEPHONE SET COMPRISING A LINE VOLTAGE STABILIZER HAVING A DC SUPPLY POINT

BACKGROUND OF THE INVENTION

1. Field of the Invention

The invention relates to a telephone set supplied by line direct voltage through two wires of a subscriber line, the set comprising an active line voltage stabilizer circuit connected between the aforesaid wires of the subscriber line, the circuit comprising two output terminals with there being between them a direct voltage which is independent of the line direct current, a first terminal of which being connected to a first of the aforesaid wires via a resistor substantially conducting the whole line direct current, with there being connected between this first terminal and the second wire a series arrangement composed of a capacitor and a further resistor, the capacitor connections of which constituting a direct voltage supply output.

The invention likewise relates to a line voltage stabilizer circuit suitable for use in such a telephone set.

2. Description of the Related Art

Such a telephone set is known from the public application report "Application of the transmission circuit TEA 1060 and the supply circuit TEA 1080", report number ETT 8506, N. V. Philips' Gloeilampenfabrieken, The Netherlands, more specificially page R23, FIG. AP1.

The stabilizier circuit shown in the above publication comprises an operational amplifier connected to the base of an output transistor. The emitter of this output transistor, forming the first output terminal, is connected to a first wire via an emitter resistor substantially conducting the whole line direct current. The collector of the output transistor is connected to the remaining wire. A resistor (referred to as R55 in the above-mentioned figure) is connected to an input of the operational amplifier. The other side of this resistor, forming the second terminal of the stabilizer circuit, is connected in the aforesaid publication to the second wire. The latter connection achieves the direct voltage on the subscriber line to be set to the desired value by the stabilizer circuit. It should be observed that details about achieving the desired line direct voltage are described in the Dutch patent application No. 8400508, laid open to public inspection, corresponding to U.S. Pat. No. 4,680,789, assigned to the present assignee.

In modern electronic telephone sets it is desirable to have a direct voltage supply connection from where additional equipment (such as for example DTMF dial dircuits or memories) can be supplied by power derived from the subscriber line. Such a supply connection should preferably meet the following three requirements:

1. within the working area of the telephone set the supply voltage must not depend on the magnitude of the DC line current;

2. the AC impedance of the telephone set, as seen from the subscriber line, must not be affected by the presence of the supply circuit;

3. when deriving direct current from the supply connection its direct voltage is only allowed to show a slight decrease, so its output impedance has to be low.

The stabilizer circuit shown in the aforesaid application report comprises a direct voltage supply connection for supplying additional equipment. Thereto a series circuit of a capacitor and a resistor is inserted between the first output terminal of this stabilizer circuit (thus the emitter of the output transistor) and one of the wires of the subscriber line; the capacitor connections will then form the supply connection. The object of the series resistor is to avoid the series arrangement forming too low an impedance for the audio signal to be transmitted by the telephone set. This implies that the series resistor must not have a much smaller value than the line terminating impedance. A customary value for the line terminating impedance is 600Ω. As the output impedance of the supply connection is mainly formed by the aforesaid series resistor, this circuit does not meet the third requirement of having a low output impedance.

SUMMARY OF THE INVENTION

The object of the invention is to provide a telephone set comprising an active line voltage stabilizer circuit, its direct voltage supply point having a low direct current output impedance, indeed meeting the first two requirements.

To that end the telephone set according to the invention is characterized in that the second output terminal of the stabilizer circuit is connected to the series arrangement such that there is a resistor between this second terminal and the second wire.

As the constant voltage present between the two said terminals of the stabilizer circuit does not vary when supply current is derived, the output impedance of the supply connection will be equal to a possibly present resistance between the second output terminal and the relevant supply terminal, which resistance can be chosen to be low.

For certain configurations and values of the components comprised in the active stabilizer circuit, inserting a pure capacitance between the aforesaid output terminals may cause oscillations of this circuit. To avoid these oscillations the telephone set in accordance with the invention is characterized in that there is a further resistance between the second terminal and the capacitor. This resistance whose value can be selected to be low relative to the internal resistance from the aforesaid application report, now functions as a damping resistance for the undesired oscillations.

BRIEF DESCRIPTION OF THE DRAWING

The invention and its advantages will now further be described with reference to the sole FIGURE. The FIGURE shows a telephone set comprising an active line voltage stabilizer circuit having a direct voltage supply connection in accordance with the invention.

DESCRIPTION OF THE PREFERRED EMBODIMENTS

The FIGURE only shows the components of the telephone set which are relevant to the invention. The subscriber line to which the telephone set is connected when in operation and through which the set is power supplied, is connected to line terminals 2-1 and 2-2. Active line voltage stabilizer circuit 4 is connected to the wires 6 and 8 of this subscriber line. This circuit 4 comprises two output terminals 10-1 and 10-2, a stabilized direct voltage being present between them. Output terminal 10-1 is connected to wire 8 via resistor 12. In addition, this output terminal is connected to wire 6 via a series arrangement of a capacitor 14 and resistor 16 and a resistor 18. The terminals of capacitor 14 form the direct voltage supply output 20.

The two wires 6 and 8 are interconnected via a series arrangement of a line terminating resistance 22 and capacitor 24. The junction point of the latter two components forms a supply point for supplying the stabilizer circuit 4.

Stabilizer circuit 4 comprises an operational amplifier 26, to the output of which the base of a final transistor 28 is connected. The emitter of this final transistor is connected to output terminal 10-1, its collector being connected to wire 6. The inverting input of amplifier 26 is connected to the emitter of transistor 28 via a voltage reference 30; this voltage reference can for example be designed in the form of a single or a plurality of forward biased diodes. The non-inverting input of amplifier 26 is connected via a resistor 32 to the emitter of transistor 28, via capacitor 34 to wire 8 and via resistor 36 to output terminal 10-2.

The difference in voltage between the output terminals 10-1 and 10-2 does not depend on the line current and neither does it depend on the current derived from this output formed by the terminal pair 10-1 and 10-2, which can be appreciated from the following:

The difference in voltage between terminals 10-1 and 10-2 equals the sum of the voltages across resistor 32 and across resistor 36. The voltage across resistor 32 equals the reference voltage $V_j$ of reference source 30, because amplifier 26 controls such that both inputs show substantially equal voltages. The voltage across resistor 36 is as many times as much as the resistance ratio of resistor 36 to resistor 32 (all direct current through resistor 36 also passes through resistor 32) so that the following holds for the direct voltage $V_{10}$ between the terminals 10-1 and 10-2:

$$V_{10} = \left(1 + \frac{R36}{R32}\right) V_j \qquad (1)$$

with $R_{36}$ and $R_{32}$ representing the value of resistor 36 and resistor 32 respectively. From formula (1) it turns out that the voltage between the output terminals 10-1 and 10-2 does not depend on the line current, neither does it depend on the current which is possibly derived from the output 20. It also turns out that the internal resistance (output impedance) shown by supply output 20, equals resistance 16; this can be chosen to be adequately small.

The alternating voltage impedance, as observed from the subscriber line (thus between wires 6 and 8) is adequately high not to affect the value of the total line terminating impedance, which can be explained as follows:

Let it be assumed that the impedance of capacitor 34 in the audio range is negligibly small with respect to resistance 36. Let it likewise be assumed that resistance 36 is large with respect to the parallel impedance of resistor 18 on the one hand and the series arrangement of resistor 16, capacitor 14 and resistor 12 on the other. If the ratio of resistance 36 to the parallel impedance of the three latter components is k, this means that on terminal 10-2 there is present k times the line signal voltage. The voltage on the noninverting input of amplifier 26 then equals the product of k times the line signal voltage and ratio of the impedance of capacitor 34 divided by resistance 36. Through the combination of stabilizer circuit 4 and the supply circuit connected thereto there flow three signal currents $i_1$, $i_2$ and $i_3$: $i_1$ flowing through transistor 28, $i_2$ through resistor 36 and $i_3$ through resistor 16. Let it be assumed that $i_2$ can be neglected with respect to the other currents. The sum current $i_s$ of $i_1$ and $i_3$ flows through resistor 12 causing the voltage of the inverting input of the amplifier to become equal to the product of the sum current and resistance 12. Equalization of the voltages on the two amplifier inputs will yield the following for the impedance Z of the whole circuit:

$$Z_1 = \frac{R_{12} R_{36} \omega C_{34}}{k}$$

with $R_{12}$ being the value of resistor 12, $R_{36}$ being the value of resistor 36 and $C_{34}$ being the capacitance of capacitor 34.

This impedance $Z_1$ is therefore frequency-dependent as a self-inductance, and in the audio frequency range can be made sufficiently large relative to the line terminating impedance.

Resistor 16, determining the internal resistance of supply point 20 is an attenuation resistance for attenuating any oscillations which can be caused by the insertion of capacitor 14 at the output of stabilizer circuit 4.

Capacitor 14 has to prevent the audio signal voltage between wires 6 and 8 from leaking to output 20. Thus the value of this capacitor has to be chosen such that for practical purposes it forms a short-circuit over the entire audio range. Likewise capacitor 14 has to short-circuit any voltage variations coming from a variable load so that they will not disturb the audio signal on the line.

The above has shown that the described stabilizer circuit with supply point meets the aforesaid requirements. A practical implementation of this circuit possesses for example the component values according to the following table:

| Reference numeral | Type of component | Values |
|---|---|---|
| 12 | resistor | 20 Ω |
| 14 | capacitor | 100 μF |
| 16 | resistor | 50 Ω |
| 18 | resistor | 500 Ω |
| 22 | resistor | 620 Ω |
| 24 | capacitor | 100 μF |
| 32 | resistor | 20 kΩ |
| 34 | capacitor | 1 μF |
| 36 | resistor | 17 kΩ |

What is claimed is:

1. A telephone set adapted to be supplied with direct voltage from the two wires of a subscriber line connected thereto, such telephone set comprising: an active line voltage stabilizer circuit connected between the subscriber line wires and having a pair of output terminals between which it produces a direct voltage which is independent of the line direct current, said stabilizer circuit having a resistor in the feedback path of an operational amplifier therein, which feedback resistor is connected to a first of said output terminals; and an output stage for said stabilizer circuit connected in parallel with the subscriber line wires; characterized in that said output stage comprises:

a first resistor (18) for connecting said first output terminal of the stabilizer circuit to a first of the subscriber line wires;

a second resistor (12) for connecting the second output terminal of the stabilizer circuit to the second of the subscriber line wires, said second resistor conducting substantially all of the line direct current;

a capacitor (14), one terminal of which is connected to said output terminal of said stabilizer circuit; and a third resistor (16) connecting the other terminal of said capacitor to said first output terminal of said stabilizer circuit, said third resistor having a resistance which is smaller than that of said first resistor;

said stabilizer circuit producing a stabilized direct voltage across the terminals of said capacitor which is a direct supply voltage for other circuit components of said telephone set.

* * * * *